US00RE38357E

(19) United States
(12) Reissued Patent
Amemiya et al.

(10) Patent Number: US RE38,357 E
(45) Date of Reissued Patent: Dec. 23, 2003

(54) SURFACE DISCHARGE TYPE PLASMA DISPLAY PANEL

(75) Inventors: Kimio Amemiya, Koufu (JP); Yukio Tanaka, Koufu (JP); Hitoshi Teshirogi, Sagamihara (JP)

(73) Assignee: Pioneer Corporation, Tokyo (JP)

(21) Appl. No.: 09/345,835

(22) Filed: Jul. 1, 1999

Related U.S. Patent Documents

Reissue of:
(64) Patent No.: 5,742,122
Issued: Apr. 21, 1998
Appl. No.: 08/614,724
Filed: Mar. 12, 1996

(30) Foreign Application Priority Data

Mar. 15, 1995 (JP) ..... 7-055618

(51) Int. Cl.[7] ..... H01J 17/49; H01J 1/62
(52) U.S. Cl. ..... 313/582; 313/485; 313/584; 313/585; 313/586; 313/587
(58) Field of Search ..... 313/581, 582, 313/583, 584, 585, 586, 587, 483–85, 590, 642; 345/37, 60, 62, 66, 71

(56) References Cited

U.S. PATENT DOCUMENTS

| | | | | | |
|---|---|---|---|---|---|
| 3,904,906 | A | * | 9/1975 | Osawa et al. | 313/587 |
| 4,249,105 | A | * | 2/1981 | Kamegaya et al. | 313/585 |
| 4,454,449 | A | * | 6/1984 | Hall | 313/587 |
| 4,692,662 | A | * | 9/1987 | Wada et al. | 313/587 X |
| 4,703,225 | A | * | 10/1987 | Sohn | 313/587 |
| 5,541,479 | A | * | 7/1996 | Nagakubo | 313/587 |
| 5,661,500 | A | * | 8/1997 | Shinoda et al. | 313/585 |
| 5,714,840 | A | * | 2/1998 | Tanabe et al. | 313/581 |

FOREIGN PATENT DOCUMENTS

| | | |
|---|---|---|
| JP | 63-32830 | 2/1988 |
| JP | 1-279550 | 11/1989 |
| JP | 2-152138 | 6/1990 |
| JP | 4-062741 | 2/1992 |
| JP | 4-223025 | 8/1992 |
| JP | 4-274141 | 9/1992 |
| JP | 5-325793 | 12/1993 |
| JP | 6-005207 | 1/1994 |
| JP | 6-283108 | 7/1994 |
| JP | 6-267431 | 9/1994 |
| JP | 7-29497 | 1/1995 |
| JP | 7-029497 | 1/1995 |
| JP | 7-037510 | 2/1995 |
| JP | 7-295507 | 10/1995 |
| JP | 8-250029 | 9/1996 |

* cited by examiner

*Primary Examiner*—Nimeshkumar D. Patel
*Assistant Examiner*—Mariceli Santiago
(74) *Attorney, Agent, or Firm*—Sughrue, Mion, PLLC

(57) ABSTRACT

A surface discharge type plasma display panel has a dielectric layer facing to a discharge gas space and a pair of sustaining electrodes embedded in the dielectric layer and disposed apart from each other by a discharge gap on one of the substrates spaced parallel to each other at the discharge gas space. The dielectric layer includes a pair of first thickness portions formed on far ends of the electrodes from the discharge gap respectively which are larger than a second thickness portion on facing near ends of the facing electrodes. The dielectric layer is provided with a depth from its surface to the substrate larger than that on the second thickness portion between adjacent the electrodes. This plasma display panel prevents any useless expansion of the surface discharge over the sustaining electrodes. The discharge current is reduced and the electrical load on the deriving circuit for the surface discharge PDP decreases to save a power consumption and further the emission efficiency of the surface discharge type PDP is improved.

23 Claims, 10 Drawing Sheets

SURFACE DISCHARGE TYPE PLASMA DISPLAY PANEL

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a plasma display panel (also referred to hereinafter as a "PDP") used in a plasma display apparatus, and particularly to a structure of a surface discharge AC type plasma display panel.

2. Description of the Related Art

The PDPs are generally classified into the DC type (or direct discharge type) in which the discharging electrodes are exposed in the discharge space and into the AC type (or indirect discharge type) in which the discharging electrodes are covered with a dielectric layer. The AC type PDPs are also classified into two types, one is a facing surfaces discharge type in which the discharging electrodes are provide onto two substrates of back and front sides respectively and, the other is a surface discharge type in which the discharging electrodes are provide onto only one of two substrates of back and front sides. The AC type PDP is driven by a voltage application method such as the refreshing method, the matrix addressing method, the self-shifting method and so on.

FIG. 1, for example, shows a surface discharge AC type PDP with a matrix addressing method which comprises a front side substrate 1 and a back side substrate 2 facing and parallel to each other, and a discharge gas space 4 defined by these substrates and barrier ribs of an insulative material (not shown). The barrier rib partitions pixel cells to prevent the adjacent cells from leaking ultraviolet rays produced by the electrical discharge.

In the front side substrate 1, a plurality of pairs of sustaining electrodes are formed parallel to each other on the inside as row electrodes per one pixel cell. Each sustaining electrode comprises a transparent thin electrode body "S" and a metallic bus electrode "Sa" overlapped on the "S". A dielectric layer 23 is uniformly formed on and over the sustaining electrodes at a predetermined thickness "t" by using a screen printing method or the like. A MgO layer 24 is formed on this dielectric layer 23.

In the back side substrate 2, address electrodes "W" are formed parallel to each other on the inside as column electrodes in such a manner that each address electrode crosses the sustaining electrode. Fluorescent layers 11 are formed on the internal surface of the back side substrate so as to correspond to unit pixel cells respectively. The front side substrate 1 and the back side substrate 2 are assembled after aligned in a way that each address electrode and each sustaining electrode intersect apart from each other at an intersection space 4 for a discharge-oriented emission corresponding one pixel cells, and then the discharge space 4 is filled with a rare gas mixture. In this way, a surface discharge type PDP is manufactured.

This PDP is operated as follows: When a predetermined voltage is applied across each pair of the address electrodes W and the sustaining electrodes "S" embedded in the dielectric layer, a discharging region appears above the dielectric layer 23 at the crossover point of each pair of electrodes in the gaseous space 4. Ultraviolet rays emitted from the discharging region stimulate the fluorescent layer 11 to emit light radiating through the front side substrate 1 as an emission region. This discharged emission is maintained by a sustaining voltage applied between the sustaining electrodes, but canceled by an erase pulse applied between the address electrodes "W".

In the ordinary surface discharge AC type PDP, a pair of transparent thin electrode bodies "S" of the sustaining electrode have strip-shapes extending parallel to one another (to a normal line direction in FIG. 1), on and along the opposite edges of which a pair of the metallic bus electrodes "Sa" are overlapped respectively. The barrier ribs are formed on the back side substrate 2 to be placed and extended between the address electrodes W for crossing vertically apart from the sustaining electrodes to define discharge cells for light emissions. Therefore, there is a tendency of occurrence of a rib space between the barrier rib and the MgO layer 24 of the front side substrate 1 due to unevenness of top surface of the barrier ribs and the convex MgO layer caused by the bus electrode (several micrometers thickness) put on the transparent electrode body.

As shown in FIG. 1, the surface discharge in the gaseous space 4 is initiated on and between the facing edges of the transparent electrodes "S" spaced at a discharge gap "G" and then expands outward along the transparent electrodes to the bus electrodes Sa. Since the rib space between the barrier rib and the front side substrate 1 exists over the transparent electrodes, the surface discharge expands and leaks from the rib space to the adjacent cell in the gaseous space 4. Therefore, upon application of a pulse signal to a predetermined address electrodes W, there is a probability of light emission in the adjacent cell other than the predetermined discharge cell. To prevent the unwanted light emission, it is necessary to flatten the surfaces of the dielectric layer and the like and the top surface of the barrier ribs.

Furthermore, as shown in FIG. 1, the expansion of the surface discharge over the bus electrodes (both side curved dot arrows) increases the discharge current. However, light emissions over the bus electrodes (single side dot arrows) are useless, since the metallic bus electrodes "Sa" interrupts such light emissions to output, so that the emission efficiency of the PDP is reduced.

SUMMARY OF THE INVENTION

Thus, the present invention has been made to solve such a problem in view of the forgoing status. An object of the invention is to provide a surface discharge AC type plasma display panel that are capable of emitting light at a high emission efficiency.

A surface discharge type plasma display panel according to the present invention comprises;

- a pair of first and second substrates spaced parallel to each other and sandwiching a discharge gas space;
- a plurality of pairs of row electrodes extending horizontally and arranged on an internal surface of said first substrate each pair including; a pair of transparent electrodes disposed apart from each other by a discharge gap and arranged in an extending direction of said row electrodes respectively; and a pair of bus electrodes formed on far ends of said transparent electrodes from said discharge gap respectively and each having an area smaller than that of the transparent electrode;
- a dielectric layer formed on the internal surface of said first substrate and said row electrodes; a
- plurality of column electrodes extending vertically and arranged on an internal surface of said second substrates; and a plurality of barrier ribs extending vertically and formed at least between said column electrodes on the internal surface of said second substrate to define a plurality of emission regions in said discharge gas space;

characterized in that said dielectric layer comprises protruding portions each disposed on said bus electrode overlapped on said transparent electrode and each having a thickness larger than that on said transparent electrode.

In an embodiment of the surface discharge type plasma display panel according to the present invention, each of said transparent electrodes has expanded portions vertically extending from said bus electrodes.

In another embodiment of the surface discharge type plasma display panel according to the present invention, each of said transparent electrodes is a row of individual island-shaped electrodes connected to said bus electrode.

In another embodiment of the surface discharge type plasma display panel according to the present invention, said dielectric layer further comprises protruding portions disposed and extending in at least one of regions each facing a top of a corresponding one of said barrier ribs, and between adjacent bus electrodes of said emission regions arranged in the vertical direction.

In another embodiment of the surface discharge type plasma display panel according to the present invention, said protruding portions are formed only on said bus electrodes in said emission regions.

In another aspect of the invention, a surface discharge type plasma display panel comprises;

a dielectric layer facing to a discharge gas space;

a pair of facing electrodes embedded in said dielectric layer and disposed apart from each other by a discharge gap; and said dielectric layer including a pair of first thickness portions formed on far ends of said facing electrodes from said discharge gap respectively which are larger than a second thickness portion on facing near ends of said facing electrodes.

According to the invention, the following advantageous effects are achieved. Since the dielectric layer has large thickness portions on at least the bus electrodes or the far ends of said facing electrodes from said discharge gap which are selectively formed in the manufacturing process, the starting voltage for electrical discharge at the bus electrodes or the far ends from the discharge gap of the electrodes is higher than that of on the transparent electrodes or the facing near ends of said facing electrodes. As a result, the expansion of surface discharge is reduced within the transparent electrodes or the adjacent portion of the facing near ends thereof, so that useless discharge current is saved. Therefore, the electrical load on the deriving circuit for the surface discharge PCP decreases to save a power consumption and further the emission efficiency of the surface discharge type PDP is improved due to prevention of useless electrical discharge and light emissions concerning the opaque bus electrodes.

Moreover, in case that the initiated electrical discharge from the discharge gap between transparent electrodes of the row or facing electrodes expands outward along the electrodes, the dielectric layer except the protruding portions on the bus electrode make a sealing together with the barrier ribs so as to prevent the expanding discharge from leaking to the adjacent cells.

Furthermore, since each transparent electrode is individually shaped as an island connected to the bus electrode while the barrier ribs intersect the bus electrodes, the expanding discharge is prevented from leaking to adjacent cells.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings which are incorporated in and constitute a part of this invention and, together with the description, serve to explain the principles of the invention in general terms. Like numerals refer to like parts throughout the disclosure.

DETAILED DESCRIPTION OF THE PREFERRED EMBODIMENTS

The embodiments according to the present invention will be described in more detail with reference to the accompanying drawings.

Figure 1:
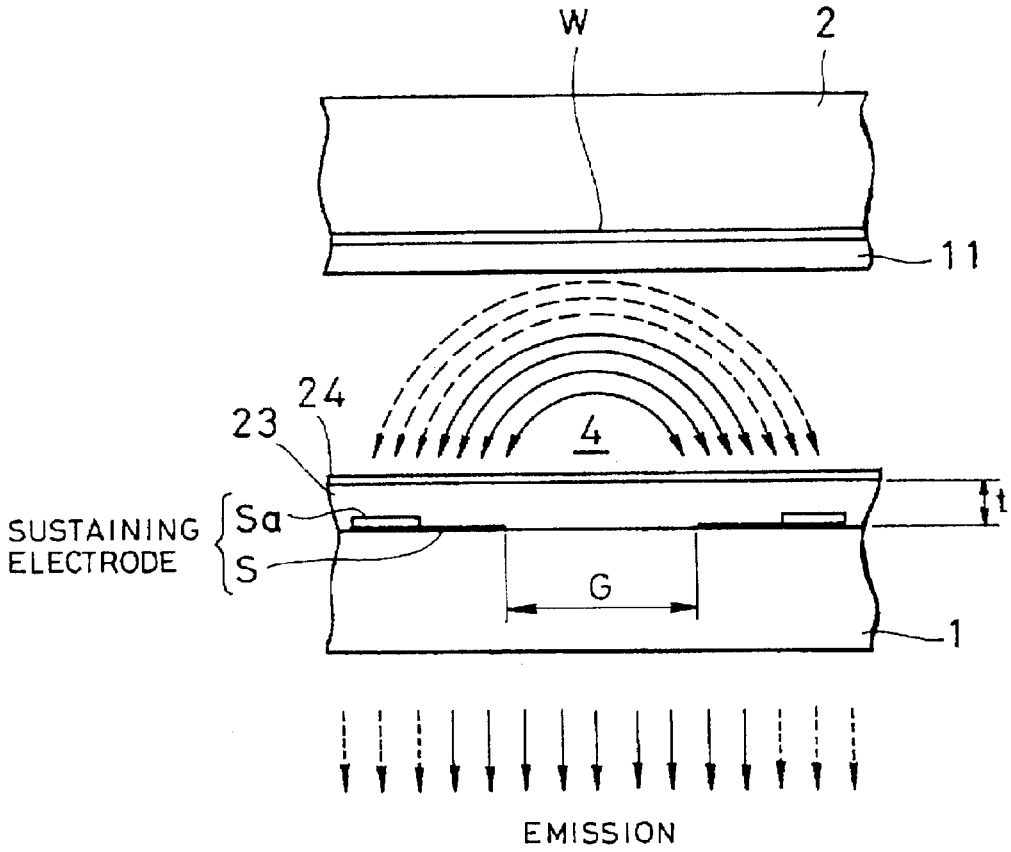
FIG. 1 is a schematic sectional view partially broken showing a conventional PDP.
Figure 2:
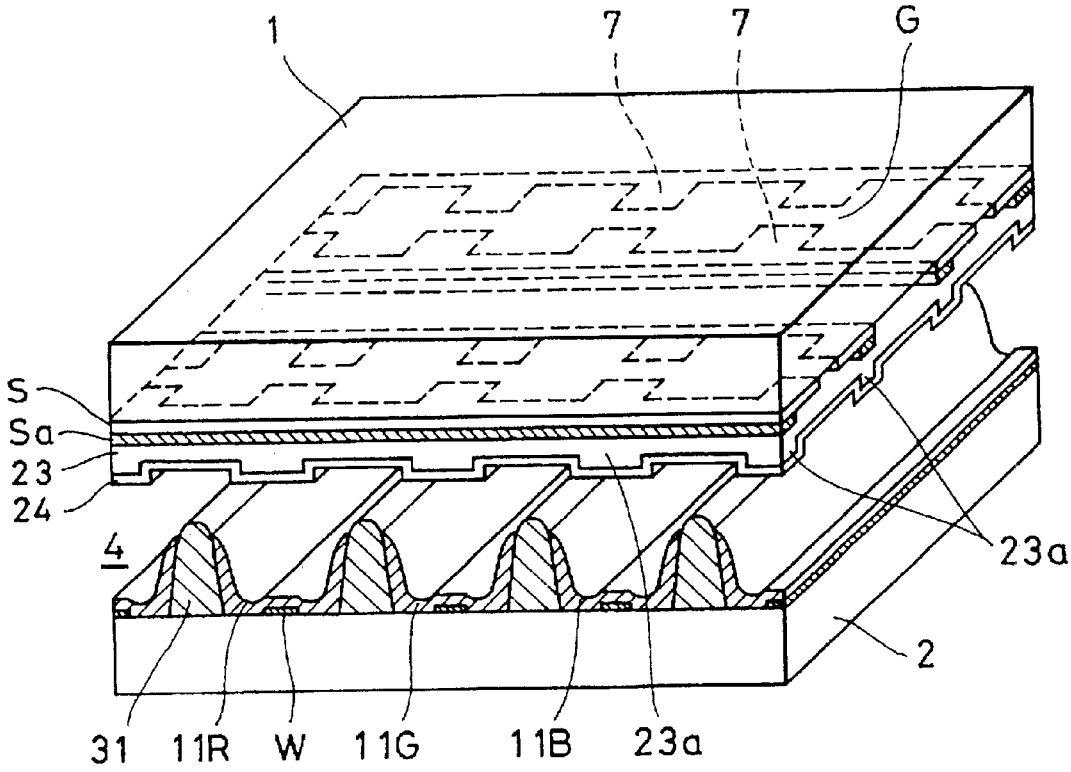
FIG. 2 is a schematic perspective view partially broken showing a PDP of one preferred embodiment according to the present invention.

FIG. 2 shows a schematic partial perspective view of the construction of a surface discharge type PDP. In this figure, there are sustaining electrodes each comprising a transparent electrode "S" and a metallic bus electrode "Sa" which is used for sustaining the electrical discharge and horizontally extend. These transparent electrodes "S" are arranged parallel to each other on the internal surface (which faces to a back side plate 2) of a front side plate 1 i.e., display surface. The transparent electrodes are made of a transparent conductive material, for example. Indium tin oxide (so-called ITO) or Tin oxide (SnO). Each transparent electrode "S" has expanded portions 7 vertically extending to the longitudinal direction thereof in such a manner that adjacent expanded portions 7 of adjacent transparent electrodes face to one another to form discharge gaps "G" for centers of emission regions between the adjacent edges of the adjacent expanded portions.

The bus electrodes "Sa" made of a conductive material such as a metal are formed and contacted onto and along the transparent electrodes "S" to reduce line-resistance of the transparent electrodes for discharge as a whole. Each bus electrode "Sa" has a narrower width than that of the transparent electrode S. The bus electrode "Sa" extends in the longitudinal direction of the transparent electrode "S" and is disposed at the far edge of the transparent electrode "S" in such a manner that the bus electrode does not possibly disturb the emitted light. In this way, the portion of the bus electrode "Sa" overlapped on the transparent electrode has an area smaller that of the transparent electrode for electrically connecting to said transparent electrodes. A pair of the bus electrodes "Sa" are disposed on the opposite far ends of the transparent electrodes with respect to the discharge gap "G" respectively. In the pair of the adjacent sustaining electrodes "S" and "Sa" each discharge gap "G" formed between the adjacent edges of the expanded portions 7 thereof is included in a unit cell.

A dielectric layer 23 is formed on the internal surface of the front side substrate so as to cover these sustaining electrodes S, Sa.

Figure 3:
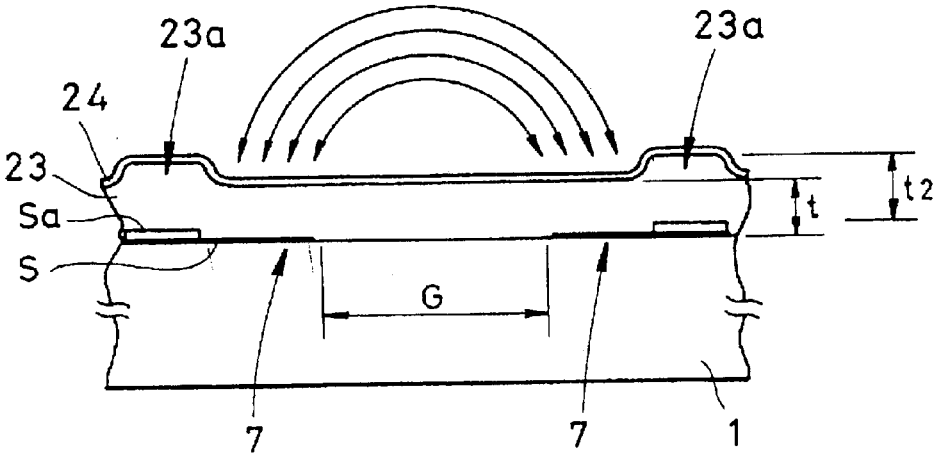
FIG. 3 is a schematic sectional view partially broken showing a front side substrate of a PDP of one preferred embodiment according to the present invention.

The dielectric layer 23 has protruding portions 23a (protruding in the discharge gas space 4) on the bus electrodes "Sa" overlapped on the transparent electrodes S. As shown in FIG. 3, the protruding portions 23a have a thickness "t2" larger than the predetermined thickness "t" of the flat portion on the transparent electrodes S. The dielectric layer 23 has a flat portion with a small thickness "t" of 20 to 30 micrometers on the transparent electrodes "S" and protruding portions 23a with a large thickness "t2" being larger than the flat portion "t" by 7 to 100 micrometers preferably 10 to 20 micrometers on the protruding portions 23a. The thickness ratio of the small thickness "t" to the protruding portion thickness "t2" ranges "t":"t2"=1:1.25 to 5.0 preferably "t":"t2"=1:1.3 to 2.0.

As shown in FIGS. 2 and 3, a MgO layer 24 made of Magnesium oxide is formed on the dielectric layer 23.

Barrier ribs 31 are formed on the internal surface of a back side substrate 2 facing the front side substrate 1 via the discharge gas space 4 in such a manner that they are disposed parallel to each other and perpendicular to the sustaining electrodes S. The barrier rib 31 is made of a reflective material such as a hardened white or transparent glass paste, or a glass paste material including a black pigment such as iron oxidize, cobalt oxidize, chromium oxidize and the like for improving the contrast of displayed images.

Address electrodes "W", i.e., column electrodes made of Aluminum (Al) or Aluminum alloy are formed between the adjacent barrier ribs 31 on the internal surface of the back side substrate 2 in such a manner that the address electrodes extends perpendicular to the sustaining electrode. Alternatively, the address electrodes W may be made of a metal having a high reflectivity such as Cu, Au and the like in addition to Al, Al alloy. These address electrodes W are classified so as to make a set of three electrodes corresponding to red (R), green (G) and blue (B) color signals for the color PDP. Fluorescent layers 11R, 11G and 11B made of red, green and blue emitting fluorescent materials are formed on these corresponding address electrodes W so as to cover the side surfaces of the barrier ribs 31 respectively.

The discharge gas space 4 is defined by the MgO layer 24 on the front side substrate 1 and the fluorescent layers 11R, 11G and 11B on the back side substrate 2 and between the barrier ribs 31. Rare gas mixture such as Ne—Ne gas or He—Xe gas is filled in the discharge gas space 4 after the two substrates are aligned and assembled.

Figure 4:
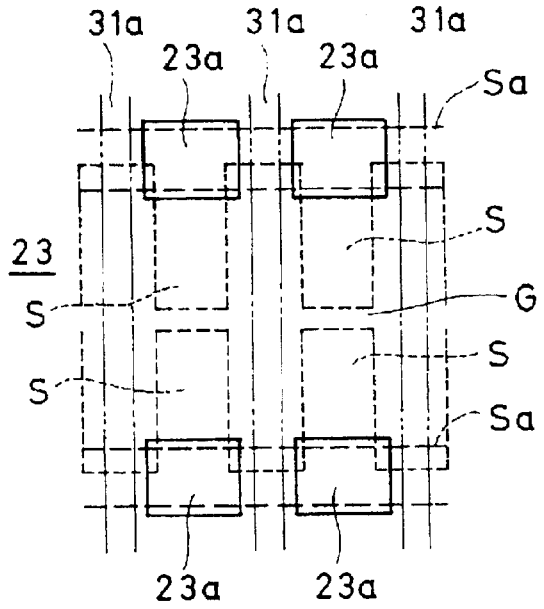
FIGS. 4 to 10 are plan views showing internal surfaces of front side substrates of PDPs of embodiments according to the present invention respectively.

In the color PDP of the embodiment as shown in FIGS. 3 and 4, since the dielectric layer 23 has large thickness portions (protruding portions 23a) on at least on the bus electrodes "Sa" overlapped on the transparent electrodes "S" which are selectively formed in the manufacturing process, the starting voltage for electrical discharge at the bus electrodes "Sa" on the far ends from the discharge gap "G" is higher than that of on the transparent electrodes S. As a result, upon applying pulse signals, the expansion of surface discharge is reduced within on the transparent electrodes S, so that useless discharge current is saved.

Moreover, when the initiated electrical discharge from the discharge gap "G" of transparent electrodes "S" expands outward (a normal line direction in FIG. 3) along the electrodes, the dielectric layer 23, 24 except the protruding portions 23a make a sealing together with the barrier ribs 31 so as to prevent the expanding discharge from leaking to the adjacent cells because of contact of the barrier ribs 31 and the dielectric layer.

Figure 5:
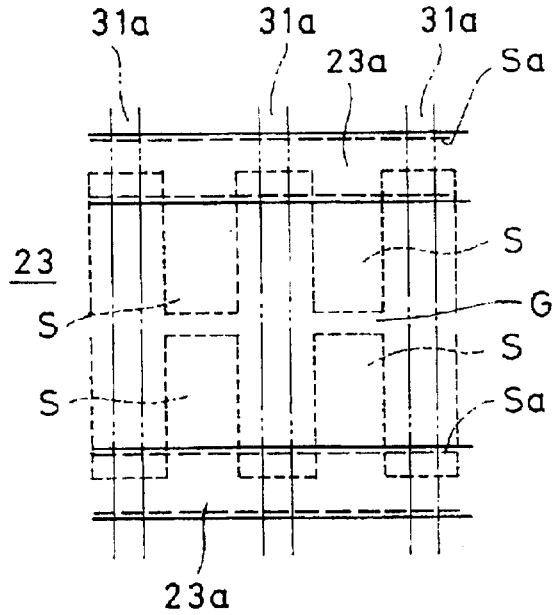

In addition to the above embodiment in which, as shown in FIG. 4, the protruding portion 23a of the dielectric layer 23 is formed only in emission regions i.e., between portions 31a facing the barrier ribs, the protruding portion 23a as shown in FIG. 5 may be formed on and extended along the bus electrodes "Sa" in the row direction crossing over the adjacent cells in another surface discharge type PDP.

Figure 6:
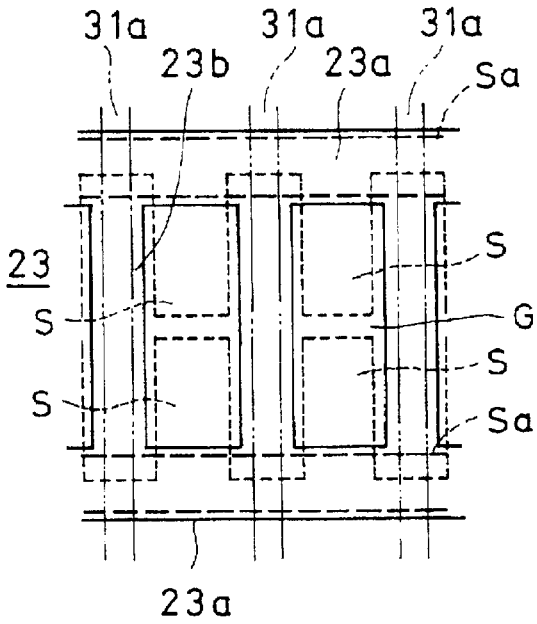

In another embodiment shown in FIG. 6, the dielectric layer 23 has not only protruding portions 23a on the bus electrodes "Sa" but also extending protruding portions 23b on portions 31a of area regions each facing the corresponding barrier rib in another surface discharge type PDP. Since the top portion of the protruding portions 23b becomes close to that of the corresponding barrier rib to form a seal, the expansion of surface discharge is prevented from leaking to the adjacent cells upon applying pulse signals.

Figure 7:
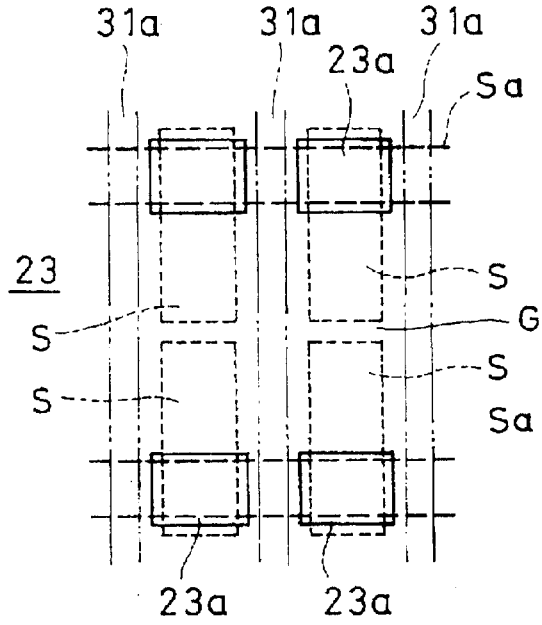

In another embodiment shown in FIG. 7, each transparent electrode "S" may be formed as a row of individual island-shaped electrodes aligned in the row direction each connected to the bus electrodes "Sa" in another surface discharge type PDP. Since the portion 31a facing the barrier rib becomes close to that of such a barrier rib to form a seal, the expansion of surface discharge is prevented from leaking to the adjacent cells upon applying pulse signals.

Figure 8:
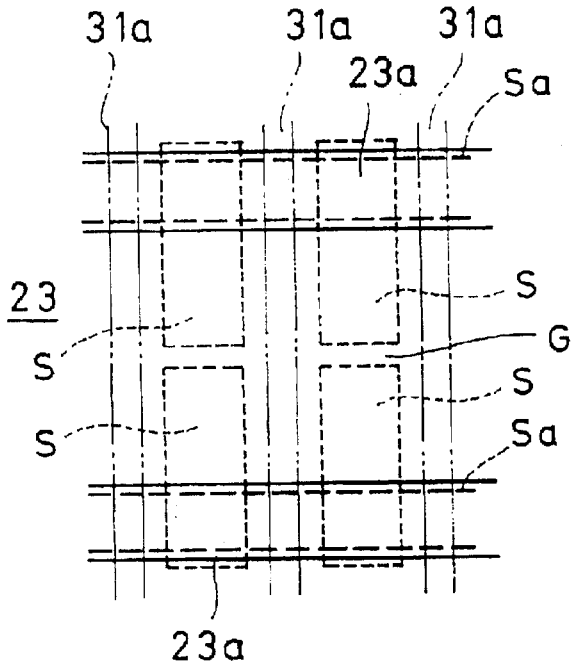

In another embodiment shown in FIG. 8, the protruding portion 23a may be formed on and extended along the bus electrodes "Sa" connecting a row of individual island-shaped electrodes "S" aligned in the row direction in another surface discharge type PDP.

Figure 9:
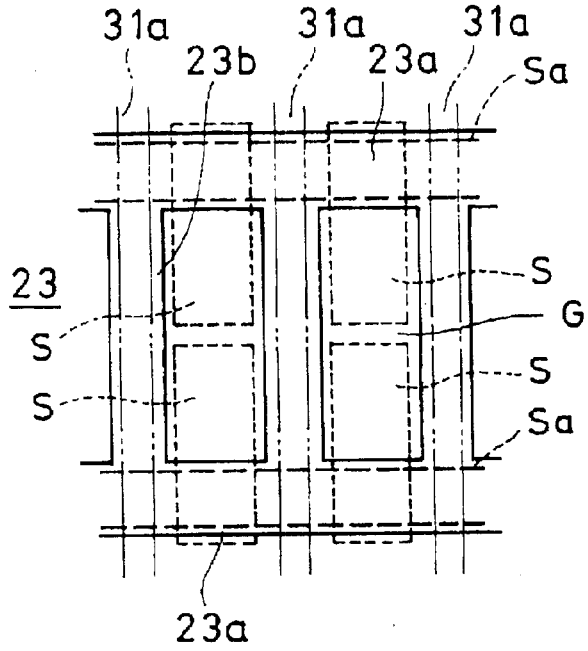

In another embodiment shown in FIG. 9, the dielectric layer 23 has not only protruding portions 23a on the bus electrode "Sa" connecting a row of individual island-shaped electrodes "S" aligned in the row direction but also protruding portions 23b on portions 31a facing to the barrier ribs in another surface discharge type PDP. Since the top portion of the protruding portions 23b becomes close to that of the corresponding barrier rib to form a seal, the expansion of surface discharge is prevented from leaking to the adjacent cells upon applying pulse signals.

Figure 10:
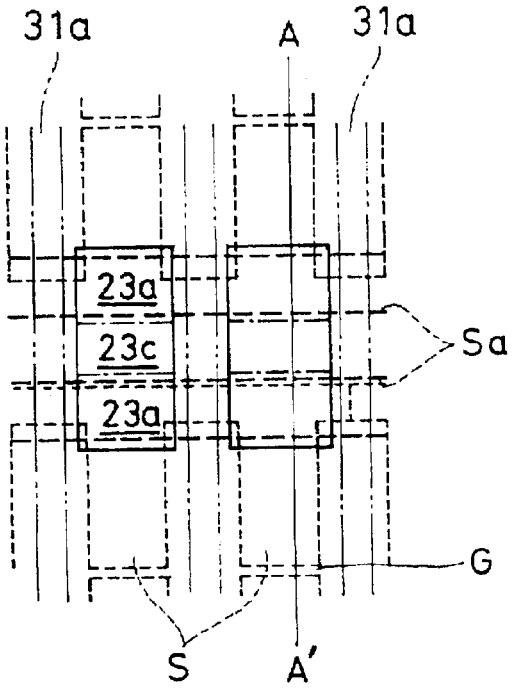
Figure 11:
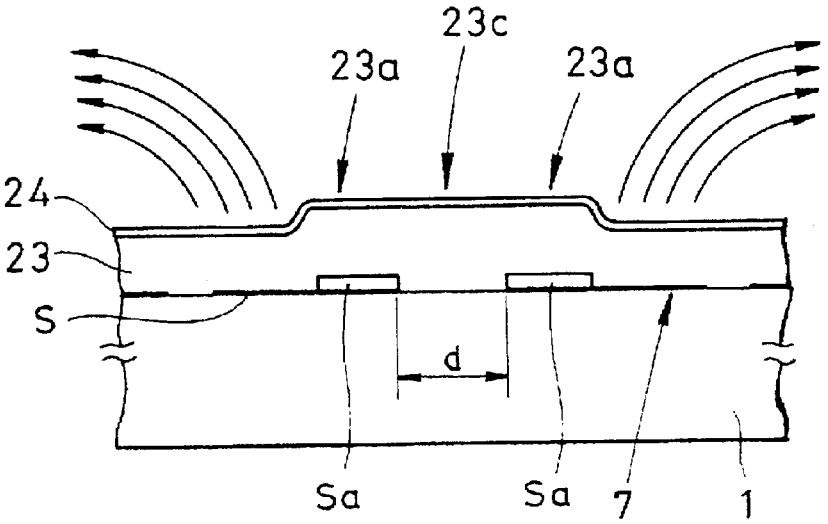
FIG. 11 is a cross-section view of a portion taken in line AA of FIG. 10.

In another embodiment as shown in FIG. 10, the dielectric layer 23 may have not only protruding portions 23a on the bus electrode "Sa" but also an intermediate protruding portions 23c between adjacent bus electrode "Sa" arranged in the vertical direction i.e., the extending directions of the barrier rib. As shown in FIG. 11, the combination of the intermediate protruding portions 23c placed between adjacent bus electrodes "Sa" and the protruding portions 23a on the bus electrodes prevents an error electrical discharge between such adjacent bus electrodes Sa. Further, the distance "d" between such adjacent bus electrodes "Sa" may be reduced so that the lengths of the expanded portions 7 of the transparent electrodes are sufficiently obtained per one discharge cell, thereby improving the emission efficiency of the PDP.

Figure 12:
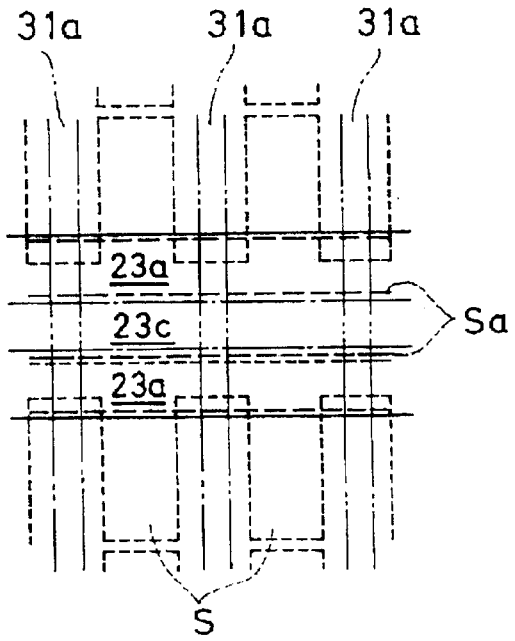
FIGS. 12 and 13 are plan views showing internal surfaces of front side substrates of PDPs of other embodiments according to the present invention respectively.

In another embodiment as shown in FIG. 12, the combination of the intermediate protruding portions 23c placed between adjacent bus electrodes "Sa" and the protruding portions 23a on the bus electrodes may be formed on and extended along the bus electrodes "Sa" in the row direction in the surface discharge type PDP.

Figure 13:
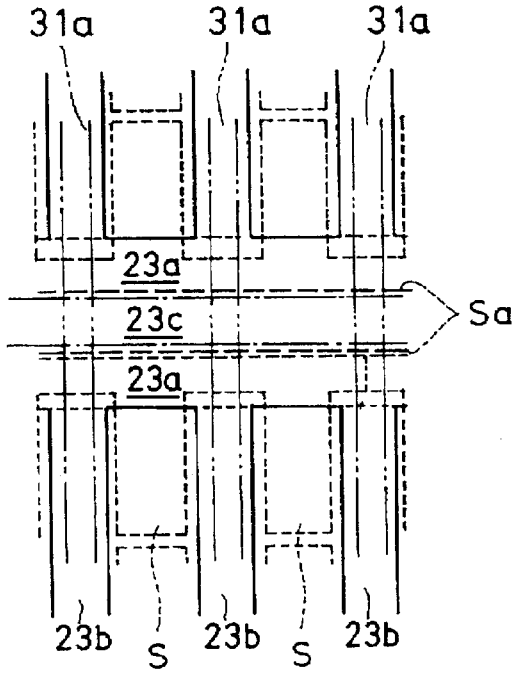

In another embodiment as shown in FIG. 13, the dielectric layer 23 has not only the combination of the intermediate protruding portions 23c and the protruding portions 23a but also protruding portions 23b on portions 31a facing to the barrier ribs in another surface discharge type PDP. In other words, the dielectric layer 23 on the front side substrate is formed with a larger thickness except on the transparent electrodes adjacent to the discharge gap G.

In addition, it is apparent that this surface discharge type PDP with the intermediate protruding portions 23c between the adjacent bus electrodes may include the island-shaped transparent electrodes "S" as shown in FIGS. 7, 8 and 9.

As seen from the above description, the present invention of the surface discharge type plasma display panel comprises; a dielectric layer facing to a discharge gas space; and a pair of facing electrodes embedded in the dielectric layer and disposed apart from each other by a discharge gap; characterized in that the dielectric layer includes a pair of first thickness portions formed on far ends of the facing electrodes from the discharge gap respectively which are larger than a second thickness portion on facing near ends of the facing electrodes.

This difference of thickness in the dielectric layer between on the inner and outer edges of the electrodes for sustaining the discharge controls the expansion of the surface discharge. This structural feature prevents any useless expansion of the surface discharge in not only the two-layer sustaining electrode structure of the transparent electrode and the bus electrodes but also a single layer electrode or a multi-layer electrode structure for sustaining the surface discharge. It is apparent to utilize the present invention for a surface discharge PDP excluding barrier ribs.

In addition, the protruding portions of the dielectric layer may be colored by a black or other dark colors by using a mixture of a glass paste and a pertinent dark pigment so as to improve the contrast between emission regions of displayed images. In this case, the common protruding portions 23, the extending ones 23b and the intermediate ones 23c as shown in FIGS. 4 to 10 and 12 and 13 are colored by a black or other dark colors.

In another embodiment, the sustaining electrodes and the address electrodes may be formed on the back side substrate, although the sustaining electrodes are formed on the front side substrate and the address electrodes are formed on the back side substrate in the above embodiments.

In another embodiment for a color PDP, fluorescent layers 11R, 11G, 11B are formed at least on the side wall of the barrier ribs 31 and on the back side substrate. Further, it is apparent to utilize the present invention for a monochrome surface discharge PDP.

Moreover, the barrier ribs 31 may be formed on the front side substrate 1 instead of the back side substrate 2 in the embodiment shown in FIG. 2. In addition, the barrier ribs 31 may be formed as a cross stripes or latticework of matrix instead of the stripe arrangement for ribs as shown in FIG. 2.

A manufacturing process for the surface discharge type of the present invention, for example the PDP including the protruding portions 23a and the intermediate ones 23c as shown in FIGS. 10 and 12 will be described in brief.

(Preparation of a Front Side Substrate)

Figure 14A:
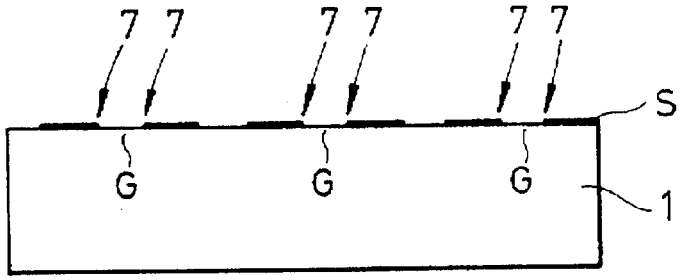
FIGS. 14A to 14E are schematic sectional views each showing a front side substrates of PDP during the formation of one embodiment according to the present invention.

First, as shown in FIG. 14A, an ITO film is vacuum-deposited on a cleaned glass plate for a front side substrate 1 at a thickness of 0.1 to 0.2 micrometers. By using a photolithography and etching, this ITO film is shaped and deformed into parallel transparent electrodes "S" each of which has the expanded portions 7 vertically extend to the longitudinal direction of the electrode (a normal line direction in FIG. 14A) so as to make the discharge gaps together with the associated adjacent expanded portions for emission regions, so that pairs of the facing expanded portions sandwiching the discharge gaps are obtained. In addition, this ITO film may be deformed as the island-shaped transparent electrodes to be connected by the bus electrodes formed later. Each discharge gap between the free ends of a pair of adjacent expanded portions of the transparent electrodes is decided by a distance of 50 to 100 micrometers.

Figure 14B:
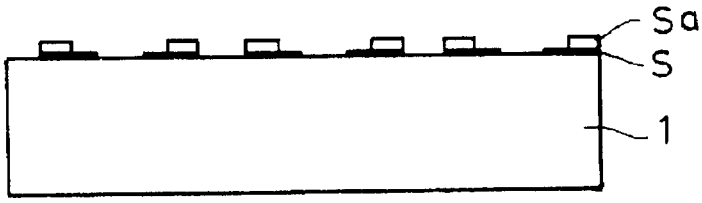

Next, as shown in FIG. 14B, a conductive material such as Al or the like is vacuum-deposited on the transparent electrodes. By using a photolithography and etching, this A1 film is transformed into the extending bus electrodes "Sa" with a thickness of 1 to 2 micrometers disposed on and along the opposite far edges of the transparent electrodes with respect to the discharge gap "G" respectively. The bus electrodes extend parallel to one another on the pairs of the transparent electrodes.

Figure 14C:
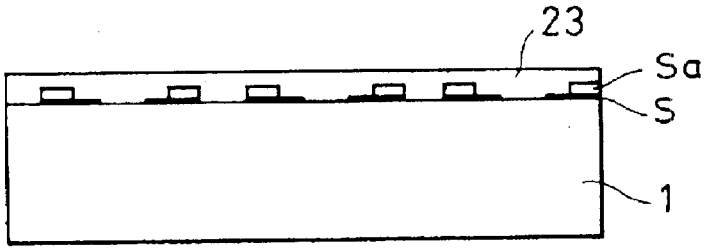
Figure 14D:
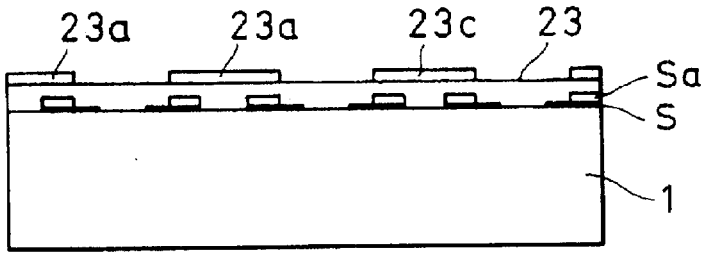

Next, as shown in FIG. 14C, the transparent electrodes and the bus electrodes on the substrate are uniformly coated with a dielectric glass paste at a thickness of 20 to 30 micrometers by a screen printing method (the first printing). Subsequently, as shown in FIG. 14D, the protruding portions 23a and the intermediate ones 23c are formed on the bus electrodes at a thickness of 7 to 100 micrometers preferably 10 to 20 micrometers by means of the screen printing method (the second printing) using a pattern mask with the corresponding openings. In addition, these protruding portions may be modified to be formed only on the bus electrodes in the emission regions as shown in FIG. 4 as well as a stripe pattern extending along the bus electrodes as shown in FIG. 5, 8 or 12 or a cross-stripe pattern extending along and between the bus electrodes as shown in FIG. 6, 9 or 13. In the second printing, the protruding portions may be mad by a glass paste material including a black pigment such as iron oxidize, cobalt oxidize, chromium oxidize and the like for improving the contrast between emission regions of displayed images.

Then this front side substrate is baked at a temperature of approximately 400 to 600 centigrade to complete the dielectric layer.

Figure 14E:
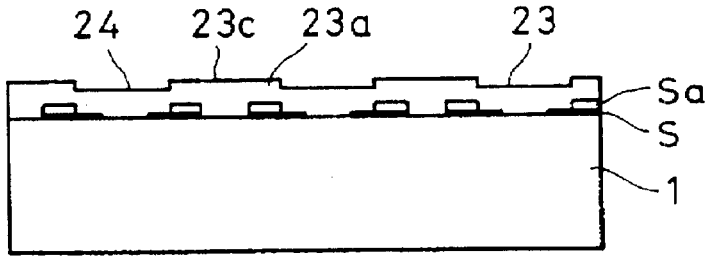

Next, as shown in FIG. 14E, after cooling the dielectric layer on the substrate with the protruding portions 23a and the intermediate ones 23c is coated with MgO by using an electron beam vacuum-deposition to form a MgO layer at a thickness of approximately hundreds nm. In this way, the front side substrate is prepared.

(Preparation of a Back Side Substrate)

First, address electrodes of Al are formed with a predetermined parallel pattern at an approximately one micrometer thickness on a cleaned glass plate for a back side substrate which has a gas hole for injecting the discharge gas.

Next, parallel barrier ribs are formed with a predetermined parallel pattern on the back side substrate between parallel address electrodes by using an impasto screen printing technology in which a transparent or opaque glass paste is repeatedly overlapped at an approximately 10 micrometers thickness per one printing up to a height of 100 to 200 micrometers under the conditions of a width of 50 micrometers and an interval of 300 micrometers.

Next, fluorescent layers corresponding to R, G and B emissions are formed on the corresponding address electrodes between the barrier ribs at a thickness of 10 to 30 micrometers by a printing method. Then this back side substrate is baked at a temperature of approximately 400 to 600 centigrade. In this way, the back side substrate is prepared.

(Assembling of a PDP)

Figure 15:
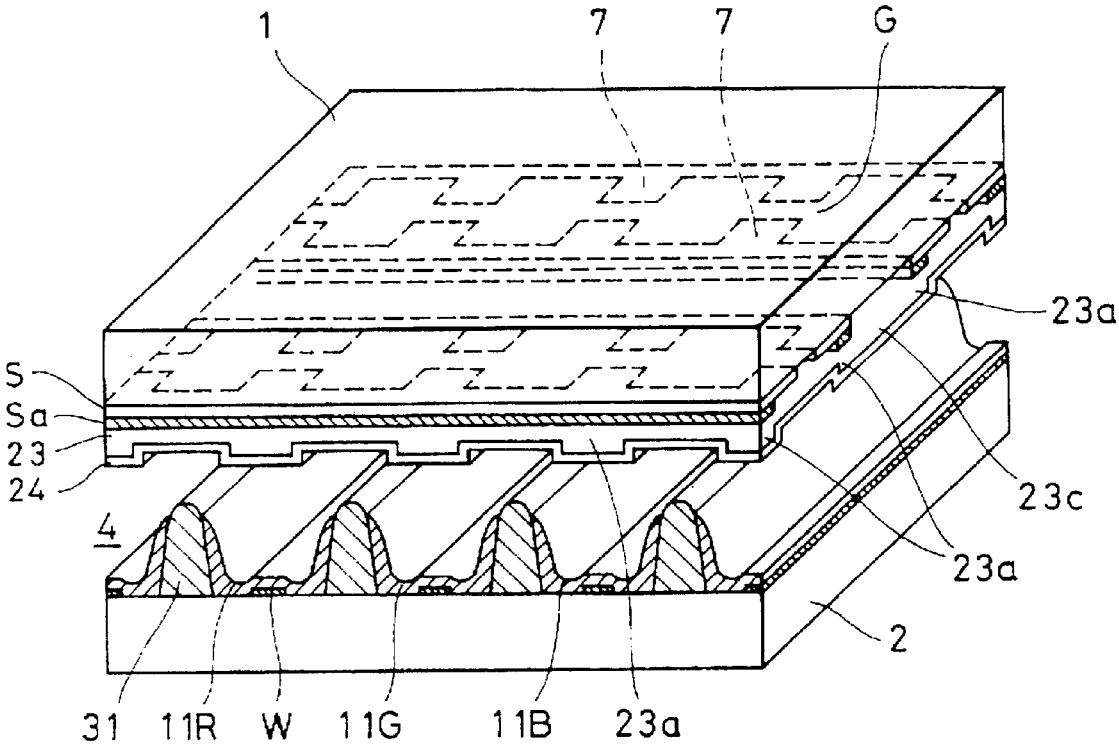
FIG. 15 is a schematic perspective view partially broken showing a PDP of one preferred embodiment according to the present invention.

The front side substrate and the back side substrate each carrying the electrodes are aligned for facing the electrode sides in a way that the longitudinal direction of the barrier ribs and address electrodes is placed perpendicular to that of the sustaining electrodes to face, and then sealed and adhered around the substrates via a predetermined spacer. After that, the inside gas space of the assembled body is exhausted through the gas hole and, then, baked to remove moistures included in the MgO layer. Next, Ne—Xe gas is injected in to the gaseous space and then the gas hole is sealed to complete the PDP including the protruding portions 23a and the intermediate ones 23c as shown in FIG. 15.

(Variety of Forms of Sustaining Electrodes)

Figure 16:
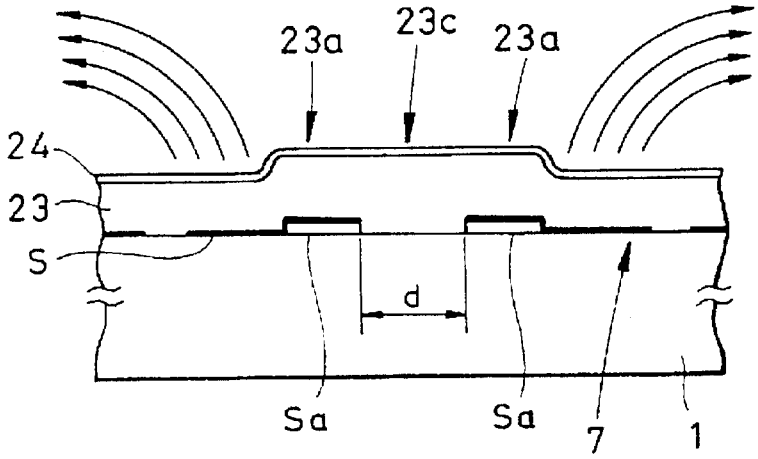
FIG. 16 is a schematic sectional view partially broken showing a front side substrate of a PDP of one preferred embodiment according to the present invention.

As shown in FIG. 16, the bus electrodes "Sa" may be previously formed on the substrate 1 prior to the transparent electrodes "S". In this case, a conductive material such as Al or the like is vacuum-deposited on a cleaned glass plate before the transparent electrodes of ITO film are vacuum-deposited thereon, in contrast with as shown in FIGS. 14A and 14B. In this way, a pair of the bus electrodes "Sa" are formed beneath far ends of the transparent electrodes "S" from the discharge gap "G" respectively.

Figure 17A:
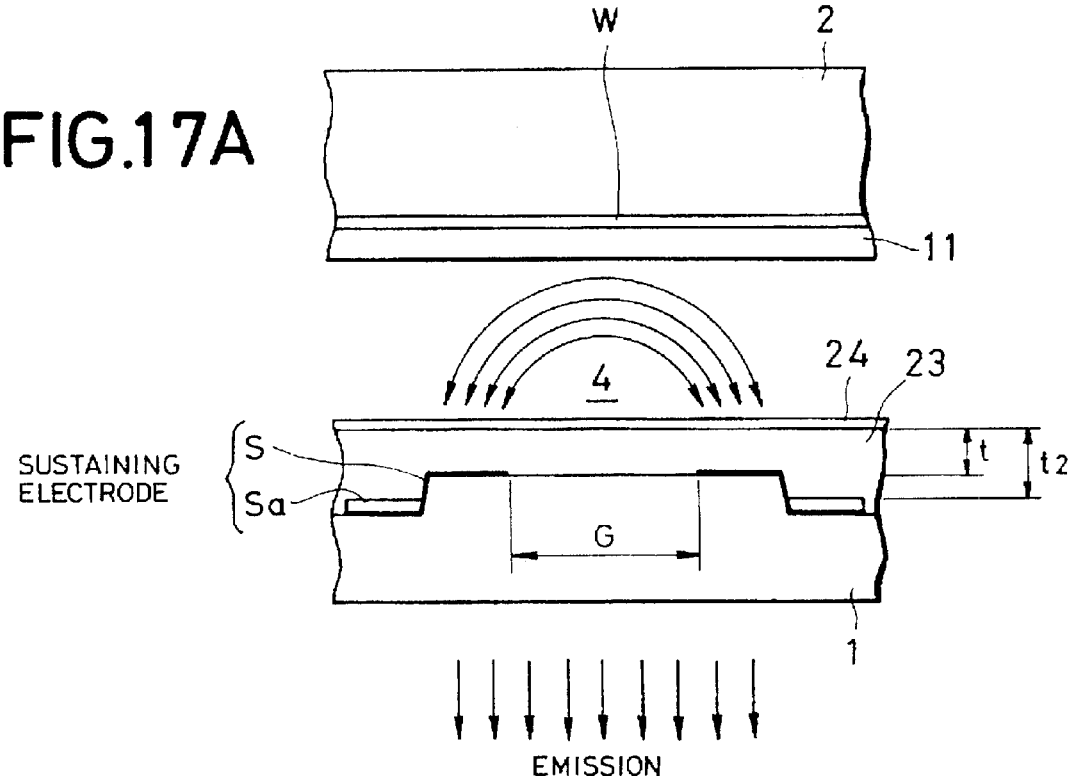
FIGS. 17A to 17C are schematic sectional views showing front side substrates of PDP in further embodiments according to the present invention.
Figure 17B:
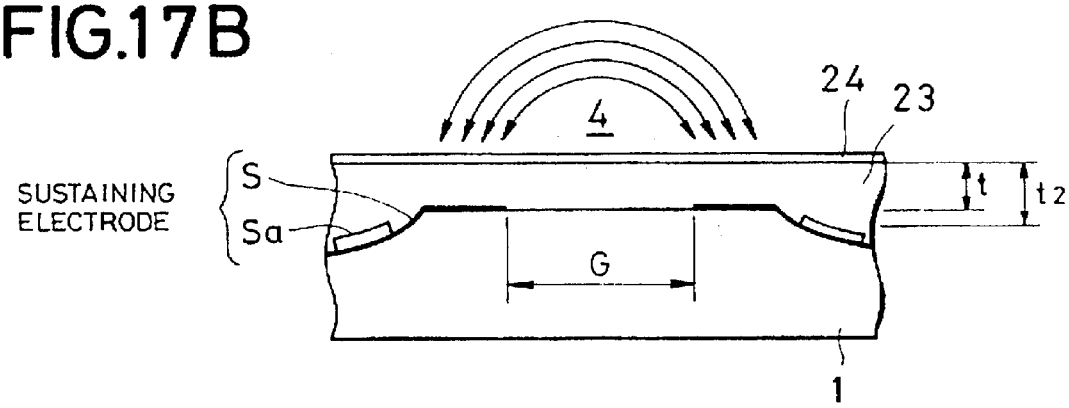
Figure 17C:
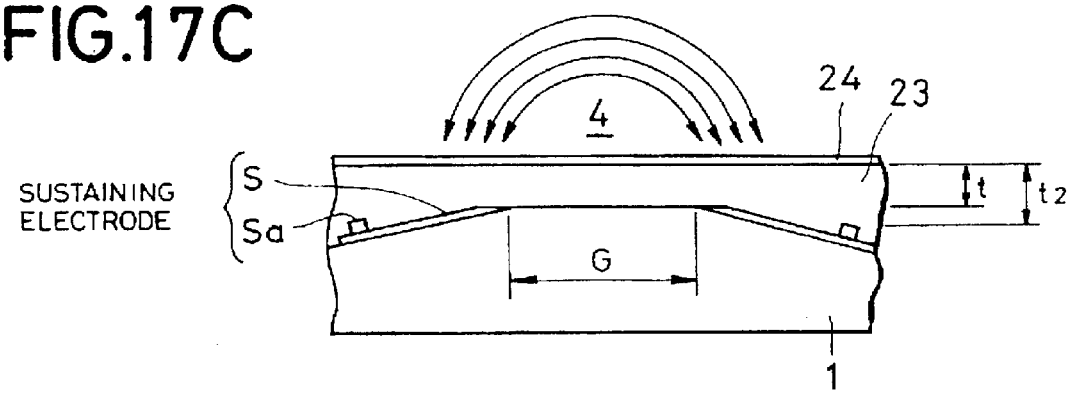

As shown in FIGS. 17A to 17C, the front side substrate 1 of each PDP in further embodiments according to the present invention comprises a flat dielectric layer 23 having a distribution in thickness on both ends of each sustaining electrode without protruding portions protecting in the discharge gas space 4. As shown in FIG. 17A, the sustaining electrodes particularly transparent electrodes are formed as a stepwise shape on the associated stepwise internal surfaces of the front side substrate 1 of the PDP. Thus each dielectric layer 23 has a pair of first portions with thickness "t2" on far ends of the transparent electrodes "S" from the discharge gap "G" and a pair of second portions with thickness "t" on facing near ends of the electrodes "S". The bus electrodes "Sa" are overlapped on the far ends of the transparent electrodes "S" from the gap "G" respectively. The first thickness "t2" is larger than the second thickness "t", of course. The range of thickness of the dielectric layer 23 and the ratio of the thickness thereof are decided similarly to the forgoing embodiment. The far ends of the transparent electrodes may be formed as a slant to facilitate the formation of the bus and transparent electrodes per se as shown in FIG. 17B. In addition, the whole shape of each transparent electrode may be formed as a slant instead of the stepwise electrodes as shown in FIG. 17C.

According to the present invention, the surface discharge type plasma display panel having a dielectric layer facing to an internal discharge gas space and a pair of sustaining electrodes embedded in the dielectric layer and disposed apart from each other by a discharge gap, is characterized in that the dielectric layer includes a pair of first thickness portions formed on far ends of the electrodes from the discharge gap respectively which are larger than a second thickness portion on facing near ends of the electrodes. This feature of the invention prevents any useless expansion of the surface discharge over the sustaining electrodes, because the starting voltage for electrical discharge at the far ends from the discharge gap of the sustaining electrodes is higher than that of on the facing near ends thereof. Therefore, the discharge current is reduced and thus the electrical load on the deriving circuit for the surface discharge PDP decreases to save a power consumption and further the emission efficiency of the surface discharge type PDP is improved.

In addition, the sealing of the barrier ribs and the dielectric layer prevents the surface electrical discharge from leaking to the adjacent cells.

It should thus be apparent that the scope of the teaching of this invention is not intended to be limited by only the embodiments that have been expressly disclosed and illustrated, but that instead the scope of the teaching of this invention should be read as being commensurate with the scope of the claims that follow.

What is claimed is:

[1. A surface discharge type plasma display panel comprising:

a pair of first and second substrates spaced parallel to each other and sandwiching a discharge gas space;

a plurality of pairs of row electrodes extending horizontally and being arranged on an internal surface of said first substrate;

each pair of row electrodes including:

a pair of transparent electrodes disposed apart from each other to form a discharge gap, and arranged to extend in a horizontal direction; and a pair of bus electrodes respectively formed on or beneath far ends of said transparent electrodes from said discharge gap, and each bus electrode of said pair of bus electrodes having an area smaller that of the transparent electrode;

a dielectric layer formed on the internal surface of said first substrate and said plurality of pairs of row electrodes;

a plurality of column electrodes extending vertically and arranged on an internal surface of said second substrates; and a plurality of barrier ribs extending vertically and being formed at least between said column electrodes on the internal surface of said second substrate to define a plurality of emission regions in said discharge gas space;

wherein said dielectric layer comprises protruding portions each being disposed on a respective one of said bus electrodes overlapped on a respective one of said transparent electrodes, being arranged in the vertical direction, and each having a thickness on said respective one of said bus electrodes being larger than a thickness on other portions of said dielectric layer located on said respective one of said transparent electrodes and between the bus electrodes.]

2. A surface discharge type plasma display panel [according to claim 1] *comprising:*

*a pair of first and second substrates spaced parallel to each other and sandwiching a discharge gas space;*

*a plurality of pairs of row electrodes extending horizontally and being arranged on an internal surface of said first substrate;*

*each pair of row electrodes including:*

*a pair of transparent electrodes disposed apart from each other to form a discharge gap; and*

*a pair of bus electrodes respectively formed on or beneath far ends of said transparent electrodes from said discharge gap and arranged to extend in a horizontal direction;*

*a dielectric layer formed on the internal surface of said first substrate and said plurality of pairs of row electrodes:*

*a plurality of column electrodes extending vertically and arranged on an internal surface of said second substrates; and*

*a plurality of barrier ribs extending vertically and being formed at least between said column electrodes on the internal surface of said second substrate to define a plurality of emission regions in said discharge gas space;*

*wherein said dielectric layer comprises protruding portions each being disposed on a respective one of said bus electrodes, and each of said protruding portions having a thickness larger than a thickness of other portions of said dielectric layer; and* wherein each of said transparent electrodes has *notches with* expanded portions vertically extending from said bus electrodes.

3. A surface discharge type plasma display panel [according to claim 1,] *comprising:*

*a pair of first and second substrates spaced parallel to each other and sandwiching a discharge gas space;*

*a plurality of pairs of row electrodes extending horizontally and being arranged on an internal surface of said first substrate;*

*each pair of row electrodes including;*

*a pair of transparent electrodes disposed apart from each other to form a discharge gap; and*

*a pair of bus electrodes respectively formed on or beneath far ends of said transparent electrodes from said discharge gap and arranged to extend in a horizontal direction;*

*a dielectric layer formed on the internal surface of said first substrate and said plurality of pairs of row electrodes;*

*a plurality of column electrodes extending vertically and arranged on an internal surface of said second substrates; and*

*a plurality of barrier ribs extending vertically and being formed at least between said column electrodes on the internal surface of said second substrate to define a plurality of emission regions in said discharge gas space;*

*wherein said dielectric layer comprises protruding portions each being disposed on a respective one of said bus electrodes, and each of said protruding portions having a thickness larger than a thickness of other portions of said dielectric layer, and* wherein each of said transparent electrodes is a row of individual island-shaped electrodes connected to said bus electrode.

4. A surface discharge type plasma display panel [according to claim 1] *comprising;*

*a pair of first and second substrates spaced parallel to each other and sandwiching a discharge gas space;*

*a plurality of pairs of row electrodes extending horizontally and being arranged on an internal surface of said first substrate;*

*each pair of row electrodes including:*

*a pair of transparent electrodes disposed apart from each other to form a discharge gap; and*

*a pair of bus electrodes respectively formed on or beneath far ends of said transparent electrodes from said discharge gap and arranged to extend in a horizontal direction;*

*a dielectric layer formed on the internal surface of said first substrate and said plurality of pairs of row electrodes;*

*a plurality of column electrodes extending vertically and arranged on an internal surface of said second substrates; and*

*a plurality of barrier ribs extending vertically and being formed at least between said column electrodes on the internal surface of said second substrate to define a plurality of emission regions in said discharge gas space;*

*wherein said dielectric layer comprises protruding portions each being disposed on a respective one of said bus electrodes, and each of said protruding portions having a thickness larger than a thickness of other portions of said dielectric layer, and* wherein said dielectric layer further comprises protruding portions disposed and extending in regions, each *of said protruding portions vertically extending along the entire length of and* facing a top of a corresponding one of said plurality of barrier ribs.

5. A surface discharge type plasma display panel [according to claim 1,] *comprising:*

*a pair of first and second substrates spaced parallel to each other and sandwiching a discharge gas space;*

*a plurality of pairs of row electrodes extending horizontally and being arranged on an internal surface of said first substrate;*

*each pair of row electrodes including:*

*a pair of transparent electrodes disposed apart from each other to form a discharge gap; and*

*a pair of bus electrodes respectively formed on or beneath far ends of said transparent electrodes from said discharge gap and arranged to extend in a horizontal direction;*

*a dielectric layer formed on the internal surface of said first substrate and said plurality of pairs of row electrodes;*

*a plurality of column electrodes extending vertically and arranged on an internal surface of said second substrates; and*

*a plurality of barrier ribs extending vertically and being formed at least between said column electrodes on the internal surface of said second substrate to define a plurality of emission regions in said discharge gas space;*

*wherein said dielectric layer comprises protruding portions each being disposed on a respective one of said bus electrodes, and each of said protruding portions having a thickness larger than a thickness of other portions of said dielectric layer, and* wherein said protruding portions are colored black or another dark color.

6. A surface discharge type plasma display panel according to claim 2, wherein said protruding portions are colored black or another dark color.

7. A surface discharge type plasma display panel according to claim 3, wherein said protruding portions are colored black or another dark color.

8. A surface discharge type plasma display panel according to claim 4, wherein said protruding portions are colored black or another dark color.

9. A surface discharge type plasma display panel comprising:

a pair of first and second substrates spaced parallel to each other and sandwiching a discharge gas space;

a plurality of pairs of row electrodes extending horizontally and arranged on an internal surface of said first substrate;

each pair of row electrodes including:

a pair of transparent electrodes disposed apart from each other to form a discharge gap [and arranged to extend in a horizontal direction]; and a pair of bus electrodes respectively formed on or beneath far ends of said transparent electrodes from said discharge gap, and [each bus electrode of said pair of bus electrodes having an area smaller that of the transparent electrode] *arranged to extend in a horizontal direction*;

a dielectric layer formed on the internal surface of said first substrate and said row electrodes;

a plurality of column electrodes extending vertically and being arranged on an internal surface of said second substrate; and a plurality of barrier ribs extending vertically and formed at least between said column electrodes on the internal surface of said second substrate to define a plurality of emission regions in said discharge gas space;

wherein said dielectric layer comprises protruding portions each being disposed on a respective one of said bus electrodes [overlapped on a respective one of said transparent electrodes,] *as well as between a pair of said row electrodes* and each *of said protruding portions* having a thickness [on said respective one of said bus electrodes being] larger than a thickness on other portions of said dielectric layer [located on said respective one of said transparent electrodes and between the bus electrodes].

10. A surface discharge type plasma display panel according to claim 9, wherein each of said transparent electrodes has expanded portions vertically extending from said bus electrodes.

11. A surface discharge type plasma display panel according to claim 9, wherein each of said transparent electrodes has expanded portions vertically extending from said bus electrodes.

12. A surface discharge type plasma display panel according to claim 9, wherein said protruding portions are formed [only] on said bus electrodes *only* in said plurality of emission regions without contacting with said barrier ribs.

13. A surface discharge type plasma display panel according to claim 9, wherein said dielectric layer further comprises protruding portions disposed and extending in regions each facing a top of a corresponding one of said plurality of barrier ribs.

14. A surface discharge type plasma display panel according to claim 9, wherein said protruding portions are colored black or another dark color.

15. A surface discharge type plasma display panel according to claim 10, wherein said protruding portions are colored black or another dark color.

16. A surface discharge type plasma display panel according to claim 11, wherein said protruding portions are colored black or another dark color.

17. A surface discharge type plasma display panel according to claim 12, wherein said protruding portions are colored black or another black color.

18. A surface discharge type plasma display panel according to claim 13, wherein said protruding portions are colored black or another dark color.

19. A surface discharge type plasma display panel comprising:

a pair of first and second substrate spaced parallel to each other and sandwiching a discharge gas space;

a plurality of pairs of row electrodes extending horizontally and being arranged on an internal surface of said first substrate;

each pair of row electrodes including a pair of facing expanded portions vertically extended and disposed apart from each other by discharge gap for sustaining an electric discharge*, each of said row electrodes having notches between said facing expanded portions*;

a dielectric layer formed on the internal surface of said first substrate and said plurality of pairs of row electrodes;

a plurality of column electrodes extending vertically and being arranged on an internal surface of said second substrate; and a plurality of barrier ribs extending vertically and being formed at least between said column electrodes on the internal surface of said second substrate to define a plurality of emission regions in said discharge gas space;

wherein said dielectric layer includes a pair of first thickness portions, formed on respective far ends of said facing expanded portions which are larger than a second thickness portion formed on respective near ends of said facing expanded portions.

20. A surface discharge type plasma display panel according to claim 19, wherein said second thickness portion of said dielectric layer has a depth from its surface to said first substrate facing expanded portions, being larger, than depth of said first thickness portion layer from its surface its surface to said row electrodes.

*21. A surface discharge type plasma display panel comprising:*

*a pair of first and second substrates spaced parallel to each other and sandwiching a discharge gas space;*

*a plurality of pairs of row electrodes extending horizontally and being arranged on an internal surface of said first substrate;*

*a dielectric layer formed on the internal surface of said first substrate and said plurality of pairs of row electrodes;*

*a plurality of column electrodes extending vertically and arranged on an internal surface of said second substrate;*

*a plurality of barrier ribs extending vertically and being formed at least between said column electrodes on the internal surface of said second substrate to define a plurality of emission regions in said discharge gas space; and*

*a fluorescent layer overlying said column electrodes and the side surfaces of said barrier ribs;*

*wherein said dielectric layer contains a plurality of black or dark colored portions each existing between two vertically neighboring ones of said emission regions.*

*22. A surface discharge type plasma display panel comprising:*

*a pair of first and second substrate spaced parallel to each other and sandwiching a discharge gas space;*

*a plurality of pairs of row electrodes extending horizontally and being arranged on an internal surface of said first substrate;*

*a dielectric layer formed on the internal surface of said first substrate and said plurality of pairs of row electrodes;*

*a plurality of column electrodes extending vertically and arranged on an internal surface of said second substrate;*

*a plurality of barrier ribs extending vertically and being formed at least between said column electrodes on the internal surface of said second substrate to define a plurality of emission regions in said discharge gas space; and*

*a fluorescent layer overlying said column electrodes and the side surfaces of said barrier ribs;*

*wherein said dielectric layer contains a plurality of black or dark colored portions each existing between two vertically neighboring respective ones of said row electrodes.*

*23. A surface discharge type plasma display panel comprising:*

*a pair of first and second substrate spaced parallel to each other and sandwiching a discharge gas space;*

*a plurality of pairs of row electrodes extending horizontally and being arranged on an internal surface of said first substrate;*

*a dielectric layer formed on the internal surface of said first substrate and said plurality of pairs of row electrodes;*

*a plurality of column electrodes extending vertically and arranged on an internal surface of said second substrate;*

*a plurality of barrier ribs extending vertically and being formed at least between said column electrodes on the internal surface of said second substrate to define a plurality of emission regions in said discharge gas space; and*

*a fluorescent layer overlying said column electrodes and the side surfaces of said barrier ribs;*

*wherein said dielectric layer contains a plurality of black or dark colored portions each confronting the top region of each of said barrier ribs.*

*24. A surface discharge type plasma display panel comprising:*

*a pair of first and second substrate spaced parallel to each other and sandwiching a discharge gas space;*

*a plurality of pairs of row electrodes extending horizontally and being arranged on an internal surface of said first substrate;*

*a dielectric layer formed on the internal surface of said first substrate and said plurality of pairs of row electrodes;*

*a plurality of column electrodes extending vertically and arranged on an internal surface of said second substrate;*

*a plurality of barrier ribs extending vertically and being formed at least between said column electrodes on the internal surface of said second substrate to define a plurality of emission regions in said discharge gas space; and*

*a fluorescent layer overlying said column electrodes and the side surfaces of said barrier ribs;*

*wherein said dielectric layer contains a plurality of black or dark colored portions each existing between two vertically neighboring respective ones of said emission regions and confronting each of the top regions of said barrier ribs.*

* * * * *